United States Patent [19]

Mills, Jr.

[11] Patent Number: 5,150,798
[45] Date of Patent: Sep. 29, 1992

[54] CRUMB REMOVAL SYSTEM

[75] Inventor: William C. Mills, Jr., Dallas, Tex.

[73] Assignee: Recot, Inc., Plano, Tex.

[21] Appl. No.: 844,870

[22] Filed: Mar. 3, 1992

Related U.S. Application Data

[63] Continuation of Ser. No. 600,880, Oct. 22, 1990, abandoned.

[51] Int. Cl.⁵ .............................................. B07B 13/05
[52] U.S. Cl. ..................................... 209/660; 209/674
[58] Field of Search ............... 209/660, 674, 659, 661, 209/662, 920, 924, 606, 632, 682, 707, 666, 675

[56] References Cited

U.S. PATENT DOCUMENTS

| | | | |
|---|---|---|---|
| 2,312,665 | 3/1943 | Moore | 209/674 |
| 2,332,506 | 10/1943 | Curtis | 209/674 X |
| 2,359,890 | 10/1944 | Birdsall | 209/659 X |
| 3,059,770 | 10/1962 | Fichtmuller | 209/900 |
| 3,356,213 | 12/1967 | Weber | 209/643 |
| 3,455,445 | 7/1969 | Allen et al. | 209/707 X |
| 3,682,301 | 8/1972 | Ross | 209/675 X |
| 4,091,931 | 5/1978 | Button et al. | 209/580 |
| 4,143,769 | 3/1979 | Ripple | 209/674 X |
| 4,313,535 | 2/1982 | Carmichael | 198/766 |
| 4,519,507 | 5/1985 | Gillette et al. | 209/682 |
| 4,889,241 | 12/1989 | Cogan et al. | 209/552 |

FOREIGN PATENT DOCUMENTS

| | | | |
|---|---|---|---|
| 141916 | 9/1953 | Sweden | 209/675 |
| 26678 | of 1911 | United Kingdom | 209/682 |

Primary Examiner—Donald T. Hajec
Attorney, Agent, or Firm—Rothwell, Figg, Ernst & Kurz

[57] ABSTRACT

A crumb removal system has an inclined chute extending beneath a horizontal vibratory conveyor trough with an upper convex curved end of the inclined chute spaced in front of the discharge end of the conveyor trough. The spacing between the upper curved end of the chute and the discharge opening of the conveyor trough forms an opening through which fines and small pieces of broken snack food chips can fall and be separated from unbroken chips and larger pieces.

9 Claims, 1 Drawing Sheet

CRUMB REMOVAL SYSTEM

This is a continuation of application Ser. No. 07/600,880, filed Oct. 22, 1990 now abandoned.

BACKGROUND OF THE INVENTION

1. Field of the Invention

The invention relates to apparatus for separating smaller particles and fines from larger particles in a particle stream being discharged from the end of a conveyor, for example for separating crumbs from tortilla chips, corn chips or potato chips being fed to a weighing and packaging apparatus.

2. Description of the Prior Art

Generally fines and crumbs produced by breakage during processing and handling of fragile salty snack food chips, such as tortilla chips, corn chips and potato chips, remain within the product stream and are bagged along with the unbroken pieces. Removing the crumbs and fines reduces the quantity of bagged product produced per unit weight of raw input.

However, crumbs or fines are generally undesirable in bagged particulate food snacks since they cannot be readily picked up by fingers. Often the crumbs or fines are thrown away where the quality of the snack food presented to guests or customers is important. A fragile snack food product with reduced crumb content is desirable.

Conventional screening or sieve apparatus can be employed to separate crumbs and fines from unbroken chips. However such equipment is generally quite expensive and subject to clogging by the irregular shaped broken pieces of the snack food pieces. Such prior art equipment will tend to slow down the production lines either by low throughput or down time to clear the screens and thus increase the inefficiency of the production line.

An object of the invention is to construct an efficient and inexpensive apparatus for separating smaller particles from larger particles in a particle stream being discharged from a conveyor.

SUMMARY OF THE INVENTION

The invention is summarized in an apparatus for separating smaller particles from larger particles in a particle stream being discharged from an end of a conveyor wherein an inclined chute extends underneath the conveyor with an upper end of the chute disposed in front of the discharge end of the conveyor. The upper end of the chute is horizontally spaced from the discharge end of the conveyor by a distance forming an opening between the upper end of the chute and the discharge end of the conveyor. This opening has a width selected to permit the smaller particles to fall onto the chute and to prevent passage of the larger particles.

The present invention is particularly advantageous for providing a simple inexpensive apparatus for separating small particles and fines from larger particles while avoiding problems of clogging.

Other objects, advantages and features of the invention will be apparent from the following description of the preferred embodiment taken in conjunction with the accompanying drawings.

DESCRIPTION OF THE PREFERRED EMBODIMENT

Figure 1:
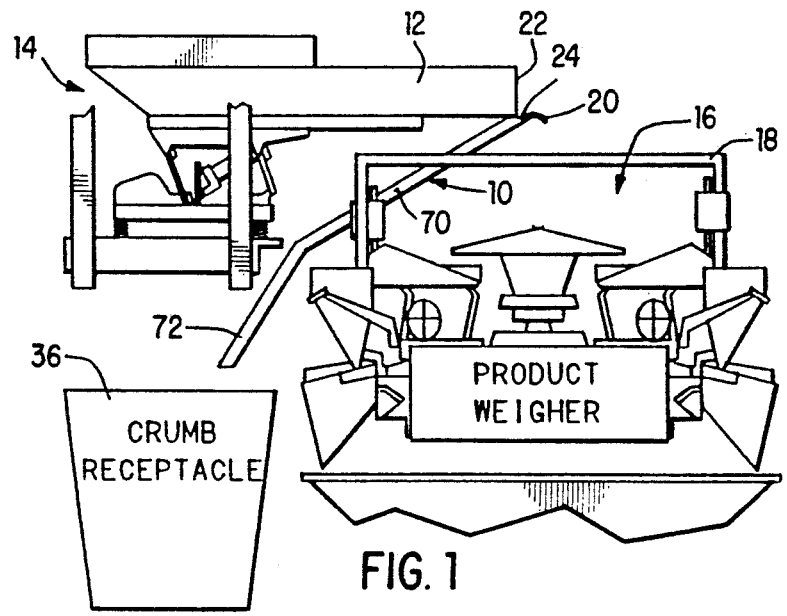
FIG. 1 is a diagrammatical side elevational view of a particulate food snack feeding station broken away from a bagging apparatus including a crumb removal system in accordance with the invention.

As shown in FIG. 1, one embodiment of the invention includes an inclined chute indicated generally at 10 extending beneath a pan or trough 12 of a conventional vibratory feeder indicated generally at 14 which is used to feed particulate food snack product such as tortilla chips, corn chips, potato chips, or the like to a conventional statistical weighing machine indicated generally at 16. The chute 10 is mounted by a frame or bracket 18 above the weigher 16. The chute 10 has an upper end 20 disposed in front of the discharge end 22 of the conveyor trough 12 so as to form an opening 24 through which crumbs and fines fall into the chute 10 and are thus separated from the stream of particles being fed by the vibratory feed trough 12 to the bagging apparatus 16.

Alternatively the vibratory conveyor can be replaced by any other conveyor mechanism which is suitable for conveying particulate materials, such as food snack chips. Preferably the conveyor mechanism includes a facilities, for example, vibrating surface, traveling belt, etc., which moves relative to the chute so as to assist in avoiding clogging of the opening between the end of the conveyor and the chute with crumbs or broken particles.

Figure 4:
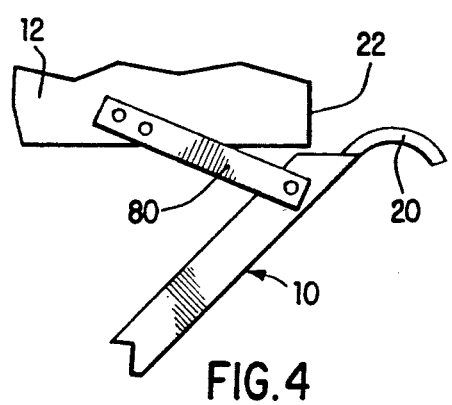
FIG. 4 is an elevation view of a broken away portion of a modified crumb removal system in accordance with the invention.

In another variation shown in FIG. 4, the chute is mounted by a suitable bracket 80 on the vibratory feeder so as to vibrate the upper end 20 out of phase with the feeder end 22. By this manner the chute 10 will also be vibrated to facilitate movement of the smaller particles down the chute and reduce the buildup of seasoning and other fine particulate material at the impact point on the chute. The mounting of the chute in FIG. 4 is isolated from the weigher 16 to avoid vibration induced weighing errors.

Figure 2:
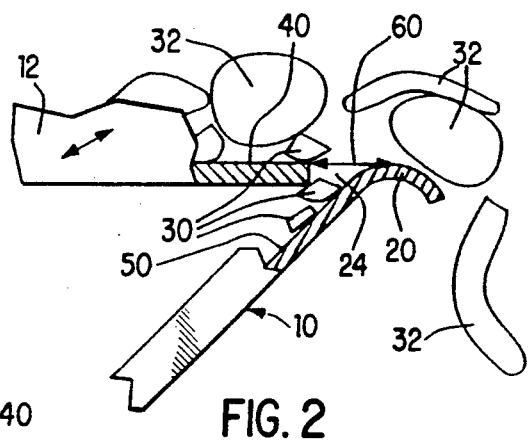
FIG. 2 is an enlarged elevation view, partially in section, of a broken away portion of the crumb removal system of FIG. 1.
Figure 3:
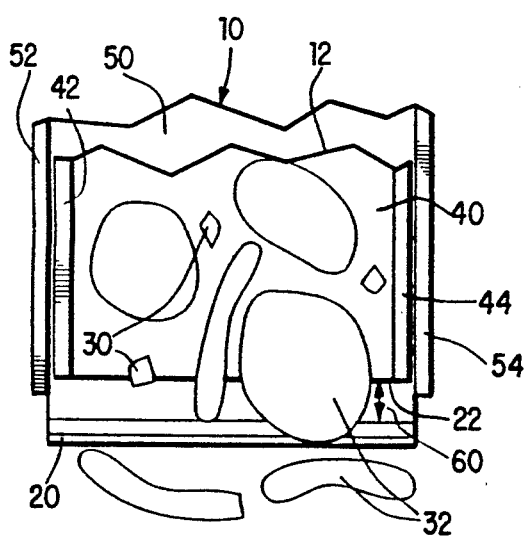
FIG. 3 is a top plan view of the broken away portion of the system of FIG. 2.

Fragile food snacks such as tortilla chips, corn chips, potato chips, and the like, suffer some breakage during processing and handling to produce crumbs or small broken pieces 30, FIGS. 2 and 3, which are mixed with larger and unbroken pieces 32. Additionally, fines such as seasoning particles are included in the stream being discharged from the vibratory feeder trough 12. Aided by the vibration of the product stream, the crumbs and fines generally gravitate to the bottom of the vibratory trough 12 where they can readily fall through the opening 24 and down the chute 10 under the force of gravity to a crumb receptacle 36, FIG. 1. The larger pieces and unbroken chips 32 are pushed over the upper end 20 of the chute 10 to fall into the weighing mechanism of the bag making and filling apparatus 16.

The conveyor trough 12 has a horizontal bottom wall 40 and a pair of opposite side walls 42 and 44 forming a channel for guiding a stream of the snack chips out the open end 22. In a conventional packaging apparatus the stream of snack chips, including the fines, crumbs, larger pieces and unbroken chips, fall directly from the open end of the conveyor trough 12 into the weighing mechanism 16.

In the illustrated embodiment, the chute 10 has a bottom wall 50 and short side walls 52 and 54 wherein the width between sidewalls 52 and 54 is slightly greater than the width of the conveyor trough 12 between its side walls 42 and 44. It not necessary for the chute 10 to have this width through its length; this width is only necessary at the upper end 20 and below the opening 24 so that the entire width of the snack chip stream is subjected to separation of the crumbs from the unbroken chips.

The upper end 20 is curved with a convex upper surface which is tangential to a horizontal plane sharing the same plane or parallel to and below the horizontal bottom wall 40 of the conveyor trough 12. The curved or rounded surface prevents damage or breakage that could be caused by a sharp edge. Preferably the end 20 has a radius of curvature in the range from one-fourth to one inch (0.63 to 2.5 centimeters). Also the upper end 20 is disposed in front of the open end 22 of the conveyor trough 12 so that the larger or unbroken chips in the chip product stream are pushed over the curved end 20 by trailing chips driven by the vibratory motion of the conveyor trough 12. Preferably the convex upper surface of the curved end 20 is tangential to the horizontal plane defined by the upper surface of the bottom wall 40 of the conveyor trough 12.

The opening 24 defined by the spacing of the curved end 20 of the chute 10 in front of the discharge end 22 of the trough 12 is selected to allow smaller particles, such as fines and crumbs or small broken pieces of chips to fall through the opening onto the chute bottom 50 below the trough 12. For triangular, rectangular, round or oval tortilla chips, corn chips and potato chips with diameters from 1 to 5 inches (2.5 to 12.7 centimeters), an opening of from about three-fourths to two inches (1.8 to 5.1 centimeters) as measured at 60 from the trough end 22 to the horizontal tangent point on the curved end 20 effectively separates most of the fines and small pieces of broken chips from the unbroken and larger chip pieces. Some smaller chip pieces (less than one inch or 2.5 cm) and fines are carried on top of larger pieces over the opening 24, but this quantity is small (equal to or less than 10% by weight of the smaller chip pieces and fines in the product stream in the trough 12 when the chute is optimally positioned) compared to the quantity of smaller chip pieces that are separated from the product stream and discharged to the crumb receptacle.

The vibrations of the trough end 22 on one side of this opening combined with a stationary or out-of-phase vibrating upper chute end 20 on the other side of this opening insure that the opening is not clogged by the irregularly shaped pieces. Pieces which hang up in the opening 24 will be either dislodged or crushed so as to fall through the opening 24 or driven over the curved end 20.

The chute 10 as illustrated in FIG. 1 has an upper portion 70 which is inclined at about 30° from a horizontal plane and a lower portion 72 which is inclined at about 60° from a horizontal plane. The particular shape of the illustrated chute 10 is dictated by the need to carry the crumbs from the discharge end 22 of conveyor trough 12 over the weighing mechanism of the bagger 16 and into the conveniently placed crumb receptacle 36. Generally any chute 10 of 30° inclination or more is suitable for carrying the crumbs away under the force of gravity. For angles of inclination which are substantially less than 30° the chute may require some assistance in addition to gravity (such a vibrations, augers, etc.) to carry the crumbs from the discharge station of the vibratory conveyor. The optimal shape of the chute will vary depending on the physical restraints surrounding its installation. In the illustrated embodiment, the chute is a single unit with two differently inclined sections extending in the same general direction. In alternative embodiments, the chute can be a simple straight or curved incline or two or more separate straight and/or curved inclines mounted at angles and extending in directions that best facilitate the removal of crumbs and particulates.

The disclosed chute 10 is relatively inexpensive and easy to install on existing or conventional product handling and processing equipment. It further provides surprisingly effective separation of smaller particles from larger particles in a product stream.

EXAMPLE 1

In an initial test of the crumb removal system, a system similar to FIG. 1 was constructed with the spacing 60 set at about 1 inch (2.5 centimeters) and with the convex upper surface of the curved end 20 tangential to the upper surface of the bottom wall 40 of the conveyor trough 12 which vibrated at a frequency of about 60 cycles per second. The curved end had a radius of curvature of about one-half inch (1.2 centimeters). Triangular tortilla chips, about 2½ to 3 inches (6.3 to 7.6 centimeters) in diameter when unbroken, were fed by the conveyor trough 12 over the curved end 20 of the chute 10. Approximately 2.5% of the total weight of a batch of triangular tortilla chips constituting about 90% of the fines and broken pieces of less than 1 inch (2.5 centimeters) in diameter were removed from the batch by passing down the chute 10.

EXAMPLE 2

In prototype crumb removal systems installed in production lines for the triangular tortilla chips, the chutes were set with the convex upper surfaces of the curved ends being about 0.25 inches (0.6 centimeters) below the horizontal planes of the conveyor troughs and with a spacing 60 of about 1 inch (2.5 centimeters). About 1% of the total weight of the product on the conveyor troughs 12 was removed by the chutes 10. This constituted about 70% by weight of the fines and broken pieces less than 1 inch (2.5 centimeters) in diameter in the product stream on the conveyor troughs 12. The chute ends 20 were spaced below the horizontal planes of the troughs 12 to overcome buildup of fines on the chutes below the opening 24; this reduces the percentage of fines and broken pieces being removed but still results in an improved product.

Since many modifications, variations and changes in detail may be made in the disclosed embodiment without departing from the scope and spirit of the invention, it is intended that all matter described above and shown in the accompanying drawings be interpreted as only illustrative of the illustrated embodiment and not limiting on the invention as defined in the following claims.

What is claimed is:

1. An apparatus for separating substantially intact products from smaller, partial pieces of the intact products, comprising:
   a conveyor means for transporting a product stream in a downstream direction, the product stream comprising substantially intact products and smaller, partial pieces of the intact products, and the conveyor means having a discharge end; and an inclined chute extending underneath the conveyor means with an upper end of the chute being disposed downstream of and horizontally spaced from the discharge end by a distance forming an opening between the discharge end and the upper end of the chute, the size of the opening being variable and selected so as to allow the passage of the smaller, partial pieces down the inclined chute in a direction opposite to the downstream direction of the product stream and to allow the passage of the substantially intact product over the upper end of the chute in the downstream direction;

wherein the upper end of the discharge chute comprises a convex curved surface for receiving product discharged from the downstream end of the conveyor means and for preventing damage to the substantially intact products as they pass thereover.

2. An apparatus as claimed in claim 1 wherein said curved convex surface is tangential with a horizontal plane.

3. An apparatus as claimed in claim 2 wherein the curved convex surface of the upper end of the chute is tangential with a horizontal plane of the feed surface of the conveyor.

4. An apparatus as claimed in claim 1 wherein the chute is inclined at an angle such that the smaller, partial pieces slide down the chute under the force of gravity.

5. An apparatus as claimed in claim 1 further comprising a receptacle disposed at a lower end of the chute to receive the smaller partial pieces.

6. An apparatus as claimed in claim 1 wherein the particle stream is snack food chip stream and the smaller, partial pieces comprise crumbs of broken chips.

7. An apparatus as claimed in claim 1 wherein the conveyor is a vibratory conveyor.

8. An apparatus as claimed in claim 7 wherein said chute is attached to said vibratory conveyor.

9. An apparatus as claimed in claim 2 wherein the upper end of the chute has a radius of curvature in the range from one-fourth to one inch (0.63 to 2.54 centimeters).

* * * * *